M. MURPHY.
CATTLE STANCHION.
APPLICATION FILED APR. 29, 1909.
947,668.
Patented Jan. 25, 1910.
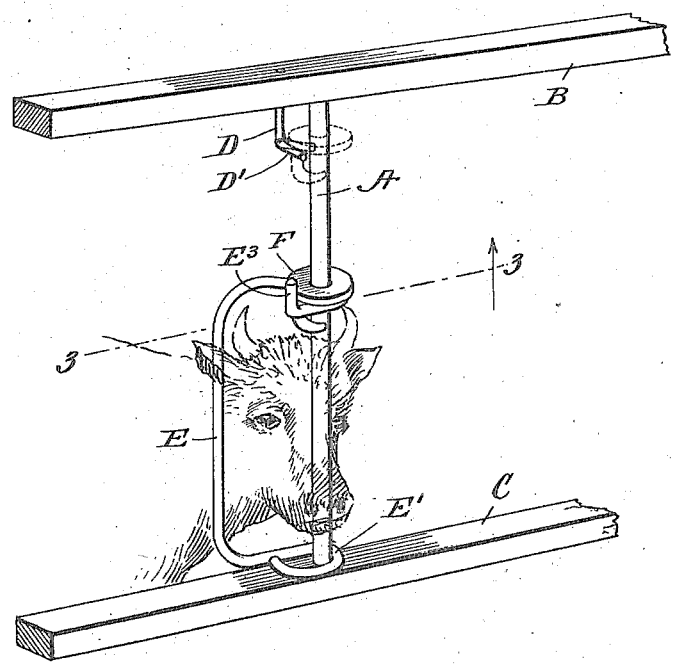
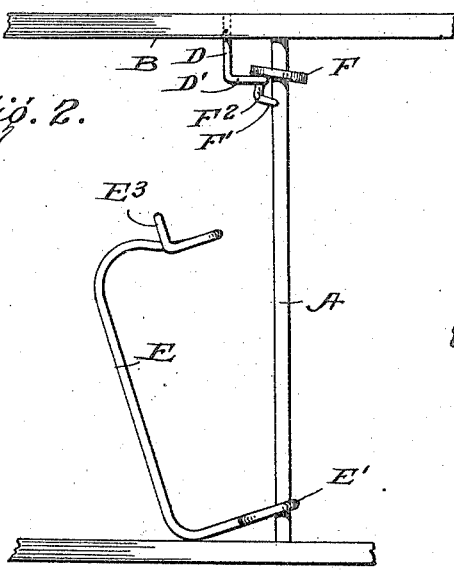
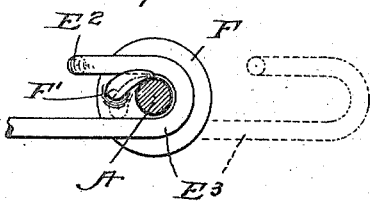
WITNESSES
L. H. Schmidt
Perry B. Turpin
INVENTOR
MICHAEL MURPHY,
BY
ATTORNEYS

UNITED STATES PATENT OFFICE.

MICHAEL MURPHY, OF GRAND MARAIS, MINNESOTA.

CATTLE-STANCHION.

947,668.  Specification of Letters Patent.  Patented Jan. 25, 1910.

Application filed April 29, 1909. Serial No. 492,836.

*To all whom it may concern:*

Be it known that I, MICHAEL MURPHY, a citizen of the United States, and a resident of Grand Marais, in the county of Cook and State of Minnesota, have made certain new and useful Improvements in Cattle-Stanchions, of which the following is a specification.

This invention is an improvement in cattle stanchions and the invention consists in certain novel constructions and combinations of parts as will be hereinafter described and claimed.

In the drawing Figure 1 is a perspective view of the invention as in use. Fig. 2 is a front elevation showing the stanchion bar thrown open, and Fig. 3 is a detail section on about line 3—3 of Fig. 1.

As shown, the stanchion includes an upright rod A, extending between the top beam B and the lower beam C, a hook D on the top beam and extending adjacent to the rod A, and a movable stanchion bar E looped at one end E' around the rod A and provided at its upper end with a returned portion $E^2$ to engage with the rod A, and having an upwardly projecting stem $E^3$ for engagement with the button F when the latter is adjusted to the position shown in Fig. 1 and turned to seat its hook F' below the returned portion $E^3$ of the stanchion bar. The hook F' it will be noticed, is deflected at its lower portion laterally from its stem $F^2$, which latter extends downwardly from the button F and when the returned portion $E^3$ of the stanchion bar is adjusted to the position shown in Fig. 1, into engagement with the rod A and the button F is lowered to the position shown in said Fig. 1, the body of the button will form an abutment for the stem $E^3$ of the stanchion bar and the hook F' of the buttons will prevent any upward displacement thereof by pressure on the stem $E^3$ against the said button so that the button will operate to secure the stanchion bar firmly in connection with the rod A so it cannot become accidentally disconnected. When it is desired to release the stanchion bar the button may be lifted by partially turning the same and then raising it on the rod to the position indicated in dotted lines, Fig. 1, where it can be held by turning the hook D to bring the lateral arm D' thereof under the button F.

While the stanchion allows the cow a great deal of freedom of movement there is no possibility of her freeing herself from it as the hook-like spur on the ring or button which locks the stanchion bar to the rod precludes her from so doing. At the same time I provide for loosely joining the stanchion bar at both ends to the upright rod so it can swing freely about the rod without becoming detached.

The stanchion bar or yoke E may be of wood, metal, or other suitable material or combination of materials as desired.

I claim—

1. A stanchion substantially as described comprising an upright rod, a stanchion bar or yoke loosely fitted at one end to the upright rod and provided at its other end with a returned portion forming a hook to engage about the upright rod and having said returned portion provided with an upwardly projecting stem, and a button slidable upon the rod to a point below the upper end of the stem, and having a hook or spur to engage below the returned portion of the stanchion bar, all substantially as and for the purposes set forth.

2. A stanchion comprising a rod, a stanchion bar or yoke linked at one end about the rod and having at its other end a returned portion forming a hook to engage about the rod, said hook having an upwardly projecting stem, and a button movable on the rod toward and from the yoke, substantially as set forth.

3. A stanchion comprising a rod, a stanchion bar or yoke connected at one end with the rod and having at its other end a returned portion forming a hook to engage about the rod, and a button slidable on the rod toward and from the hooked portion of the stanchion bar and adapted to lock the same in engagement with the upright rod, substantially as set forth.

4. A stanchion comprising an upright rod, a stanchion bar or yoke connected at one end with the rod and having at its other end a hook like portion to engage about the rod, a button slidable upon the rod toward and from the hooked portion of the stanchion bar, and means above the said stanchion bar for supporting the button when not in use, substantially as set forth.

5. A stanchion comprising an upright rod, a stanchion bar or yoke having a hooked portion to engage about the rod, and provided with an upwardly projecting stem or portion, and a button slidable upon the rod to and from a position opposite said stem whereby to form an abutment therefor and provided with means for engagement with the stanchion bar whereby to prevent accidental displacement of the button, substantially as set forth.

6. The combination in a stanchion with an upright rod, of a stanchion bar having a hooked portion to engage about the bar, a button on the rod for locking the stanchion bar in engagement with the rod, and means for locking the button to the hooked portion of the stanchion bar, substantially as set forth.

7. A stanchion comprising an upright rod, a stanchion bar or yoke linked at one end in connection with the rod and having at its end means for engagement with the rod, and a button above the bar and slidable on the rod into and out of position to secure the stanchion bar in engagement with the rod, substantially as set forth.

MICHAEL MURPHY.

Witnesses:
 JEANNETTE BENSON,
 HENRY H. HOWENSTEIN.